(12) United States Patent
Dhatchinamoorthy et al.

(10) Patent No.: US 11,675,499 B2
(45) Date of Patent: Jun. 13, 2023

(54) SYNCHRONOUS DISCOVERY LOGS IN A FABRIC STORAGE SYSTEM

(71) Applicant: Western Digital Technologies, Inc., San Jose, CA (US)

(72) Inventors: Rahul Gandhi Dhatchinamoorthy, Bangalore (IN); Kumar Ranjan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 231 days.

(21) Appl. No.: 16/906,404

(22) Filed: Jun. 19, 2020

(65) Prior Publication Data

US 2021/0397351 A1 Dec. 23, 2021

(51) Int. Cl.
*G06F 3/06* (2006.01)
*H04L 67/1061* (2022.01)

(52) U.S. Cl.
CPC ............ *G06F 3/0607* (2013.01); *G06F 3/067* (2013.01); *G06F 3/0655* (2013.01); *G06F 3/0689* (2013.01); *H04L 67/1061* (2013.01)

(58) Field of Classification Search
CPC .... G06F 3/0604; G06F 3/0605; G06F 3/0607; G06F 3/0629; G06F 3/0631; G06F 3/0632; G06F 3/0655; G06F 3/067; G06F 3/0683–0689; H04L 61/09; H04L 61/10; H04L 61/25–2596; H04L 67/104; H04L 67/1042; H04L 67/1044; H04L 67/1061–1068; H04L 67/107;

(Continued)

(56) References Cited

U.S. PATENT DOCUMENTS

2013/0176925 A1\* 7/2013 Sampath ............. H04L 25/0204
370/329
2018/0063145 A1 3/2018 Cayton et al.
(Continued)

FOREIGN PATENT DOCUMENTS

WO WO-2011082632 A1 \* 7/2011

OTHER PUBLICATIONS

International Search Report and Written Opinion for International Application No. PCT/US2021/016358, dated Jun. 30, 2021, 12 pgs.

(Continued)

*Primary Examiner* — Ilwoo Park
(74) *Attorney, Agent, or Firm* — Patent Law Works LLP

(57) ABSTRACT

Systems and methods for distributed storage systems using synchronous discovery logs for fabric subsystem discovery. Storage nodes may be configured with fabric services and a management service may provide synchronization of discovery logs across fabric subsystems and between peer fabric nodes. The peer fabric nodes may communicate with one another using a fabric network protocol and corresponding fabric subsystems may communicate with each peer fabric node. When a target subsystem fabric node updates its discovery log, the updated discovery log is sent to the corresponding peer fabric node. The corresponding peer fabric node sends the updated discovery log to each subsystem fabric node and to each peer fabric node for synchronization across all subsystem fabric nodes. A host may contact any subsystem fabric node for the updated discovery log.

20 Claims, 8 Drawing Sheets

(58) Field of Classification Search
CPC ... H04L 67/1072; H04L 67/1087–1093; H04L 67/1097
USPC ........ 709/220–222, 245; 710/3, 4, 8–10, 15, 710/19, 74; 711/154; 713/100
See application file for complete search history.

(56) References Cited

U.S. PATENT DOCUMENTS

| | | | |
|---|---|---|---|
| 2018/0270119 A1* | 9/2018 | Ballapuram | H04L 67/16 |
| 2018/0341606 A1 | 11/2018 | Bolkhovitin et al. | |
| 2020/0004701 A1 | 1/2020 | Subbarao et al. | |
| 2020/0044934 A1* | 2/2020 | Collison | H04L 41/0803 |
| 2020/0323030 A1* | 10/2020 | Mehta | H04W 84/18 |

OTHER PUBLICATIONS

Montgomery, D., NVMe over Fabrics (NVMe-oF) Explained, Western Digital Corporation Newsletter, Apr. 17, 2019, pp. 1-8.
Unknown, NVM Express® Moves Into The Future, 2016, (7 pages).
Unknown, NVM ExpressTM over Fabrics Revision 1.1, NVMe-over-Fabrics-1.1-2019.10.22-Ratified, Oct. 22, 2019 pp. 1-83.

* cited by examiner

SYNCHRONOUS DISCOVERY LOGS IN A FABRIC STORAGE SYSTEM

TECHNICAL FIELD

The present disclosure generally relates to distributed data storage systems and, more particularly, to discovery logs for host discovery of storage subsystems.

BACKGROUND

Distributed data storage systems may be configured in a flexible way such that, for example, storage capacity can be added or removed in function of the host needs, without degrading the performance as the system grows. This makes such distributed storage systems excellent candidates for large scale storage systems, but may also lead to frequent changes in system configuration, including the addition of new storage subsystems and/or storage volumes.

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ storage devices capable of communicating with one another and/or host systems over the interconnecting fabric and/or network fabric. Such fabric-based distributed storage systems may include storage devices configured with direct memory access to enable more efficient transfer of data to and from host and other systems. Reducing communication, data transfer, processing, and/or data management at the storage control plane (such as various levels of storage controllers) may reduce bottlenecks and improve scalability as the number and capacity of storage devices increases.

Various standards have been defined for enabling host software and systems to communicate with storage subsystems, such as non-volatile memory subsystems or solid-state drives (SSDs). An example standard may include Non-Volatile Memory Express (NVMe) over Fabrics (NVMe-oF). These storage subsystem communication standards may include specifications for how host systems identify new or changes storage resources in the distributed storage system. For example, system administrators may add, configure, or reconfigure the storage system to include additional storage controllers, storage nodes, storage devices, and/or storage volumes defined thereon and host systems may need to be updated regarding the availability of these new or reconfigured resources. Some fabric storage protocols may include a discovery log that includes subsystem address information and is updated to reflect these changes. A host system may query a discovery controller for the current discovery log to identify any changes in the configuration of subsystems or storage volumes available.

However, centralized discovery controllers may be difficult to maintain and subject to interruption or failure in some distributed storage systems. Maintaining individual discovery controllers at other levels of the storage hierarchy may place a burden on the host systems to maintain identification of and query multiple discovery controllers to determine the current state of the storage system. A more efficient way of enabling host systems to easily identify fabric storage resources may be needed.

SUMMARY

Various aspects for distributed storage systems with host fabric interfaces, particularly using synchronous discovery logs distributed across storage subsystems, are described.

One general aspect includes a system that includes a first fabric node that includes: a first fabric service configured to communicate with a plurality of peer fabric nodes using a network fabric protocol; and a management service configured to receive an updated discovery log that indicates a plurality of fabric subsystem addresses; and send, responsive to receiving the updated discovery log, the updated discovery log to each peer fabric node of the plurality of peer fabric nodes.

Implementations may include one or more of the following features. The system may include a plurality of subsystem fabric nodes, where a target subsystem fabric node of the plurality of subsystem fabric nodes may include a second fabric service configured to: update, responsive to mapping changes for the target subsystem fabric node, a prior discovery log to generate the updated discovery log; and send, to the first fabric node, the updated discovery log. Each subsystem fabric node of the plurality of subsystem fabric nodes may be configured to: receive the updated discovery log; store the updated discovery log; receive, from a host system, a host discovery request; and return, to the host system, the updated discovery log. The management service may be further configured to send, responsive to receiving the updated discovery log, the updated discovery log to each subsystem fabric node of the plurality of subsystem fabric nodes. Each subsystem fabric node of the plurality of subsystem fabric nodes may be further configured to receive an updated discovery log from the first fabric node. The first fabric node may be configured as a storage management controller and each subsystem fabric node of the plurality of subsystem fabric nodes may be configured as a storage node including a plurality of storage devices. The plurality of storage devices for each subsystem fabric node may be configured for access by a host system using the network fabric protocol and at least one fabric subsystem address of the plurality of fabric subsystem addresses. The management service may be further configured to: receive a mapping request from a management application; determine, based on the mapping request, the target subsystem fabric node; and send, to the target subsystem fabric node, the mapping request. The second fabric service may be further configured to receive the mapping request and determine, based on the mapping request, the mapping changes for the target subsystem fabric node. The management service may be further configured to receive the mapping request through a management network that is logically distinct from a host fabric network and the host fabric network may include communication, using the network fabric protocol, among the plurality of subsystem fabric nodes and at least one host system. The updated discovery log may be a current updated discovery log from a plurality of updated discovery logs, each updated discovery log of the plurality of updated discovery logs may include a generation counter, and the management service may be further configured to: receive the plurality of updated discovery logs; and determine, using generation counters from the plurality of updated discovery logs, the current updated discovery log. The system may further include the plurality of peer fabric nodes. Each peer fabric node of the plurality of peer fabric nodes may be configured to: receive peer updated discovery logs from the first fabric node and each other peer fabric node in the plurality of peer fabric nodes; receive subsystem updated discovery logs from a corresponding plurality of subsystem fabric nodes that corresponds to that peer fabric node; send, responsive to receiving the peer updated discovery logs, the peer updated discovery logs to the corresponding plurality of subsystem fabric nodes; and send, responsive to receiving the subsystem updated discovery logs, the subsystem updated discovery logs to the first fabric node and each other peer fabric node of the plurality of peer fabric nodes and the corresponding plurality of subsystem fabric nodes. Each peer fabric node of the plurality of peer fabric nodes may be configured as a storage management controller. Each peer fabric node of the plurality of peer fabric nodes may be configured to: communicate with the first fabric node and each other peer fabric node of the plurality of peer fabric nodes through a management network that is logically distinct from a host fabric network; and communicate with the corresponding plurality of subsystem fabric nodes through a corresponding backplane network that corresponds to that peer fabric node and is logically distinct from the host fabric network.

Another general aspect includes a computer-implemented method that includes: receiving, by a first peer fabric node of a plurality of peer fabric nodes, an updated discovery log configured to identify a plurality of fabric subsystem addresses; and sending, by the first peer fabric node and responsive to receiving the updated discovery log, the updated discovery log to each other peer fabric node of the plurality of peer fabric nodes, where each peer fabric node of the plurality of peer fabric nodes is configured to communicate with each other peer fabric node of the plurality of peer fabric nodes using a network fabric protocol.

Implementations may include one or more of the following features. The computer-implemented method may include: configuring, to communicate with the first peer fabric node, a first plurality of subsystem fabric nodes that corresponds with the first peer fabric node; updating, by a target subsystem fabric node of the first plurality of subsystem fabric nodes and responsive to mapping changes for the target subsystem fabric node, a prior discovery log to generate the updated discovery log; and sending, from the target subsystem fabric node to the first peer fabric node, the updated discovery log. The computer-implemented method may include: receiving, at the first plurality of subsystem fabric nodes, the updated discovery log; storing, at each subsystem fabric node of the first plurality of subsystem fabric nodes, the updated discovery log; receiving, at any subsystem fabric node of the first plurality of subsystem fabric nodes, a host discovery request from a host system; and returning, to the host system, the updated discovery log. The computer-implemented method may include: sending, from the first peer fabric node and responsive to receiving the updated discovery log, the updated discovery log to each subsystem fabric node of the first plurality of subsystem fabric nodes; and receiving, at each subsystem fabric node of the first plurality of subsystem fabric nodes, the updated discovery log from the first fabric node. The computer-implemented method may include: configuring the first fabric node as a storage management controller; and configuring each subsystem fabric node of the first plurality of subsystem fabric nodes as a storage node including a plurality of storage devices, where the plurality of storage devices for each subsystem fabric node is configured for access by a host system using the network fabric protocol and at least one fabric subsystem address of the plurality of fabric subsystem addresses. The computer-implemented method may include: receiving, by the first peer fabric node, a mapping request from a management application; determining, by the first peer fabric node and based on the mapping request, the target subsystem fabric node; sending, by the first peer fabric node and to the target subsystem fabric node, the mapping request; receiving, by the target subsystem fabric node, the mapping request; and determining, by the target subsystem fabric node and based on the mapping request, the mapping changes for the target subsystem fabric node. Receiving the mapping request by the first peer fabric node may include receiving the mapping request through a management network that is logically distinct from a host fabric network, and the host fabric network may include communication, using the network fabric protocol, among the first plurality of subsystem fabric nodes and at least one host system. The computer-implemented method may include: receiving, by the first peer fabric node, a plurality of updated discovery logs, where each updated discovery log of the plurality of updated discovery logs includes a generation counter; and determining, by the first peer fabric node and using generation counters from the plurality of updated discovery logs, a current updated discovery log, where the updated discovery log is the current updated discovery log from the plurality of updated discovery logs. The computer-implemented method may include: receiving, at each peer fabric node in the plurality of peer fabric nodes, peer updated discovery logs from each other peer fabric node in the plurality of peer fabric nodes; receiving, at each peer fabric node in the plurality of peer fabric nodes, subsystem updated discovery logs from a corresponding plurality of subsystem fabric nodes that corresponds to that peer fabric node; sending, from each peer fabric node receiving the peer updated discovery logs, the peer updated discovery logs to the corresponding plurality of subsystem fabric nodes; and sending, from each peer fabric node receiving the subsystem updated discovery logs, the subsystem updated discovery logs to each other peer fabric node of the plurality of peer fabric nodes and the corresponding plurality of subsystem fabric nodes.

Still another general aspect includes a storage system that includes: a plurality of peer fabric nodes configured to communicate with each other peer fabric node of the plurality of peer fabric nodes using a network fabric protocol; a corresponding plurality of subsystem fabric nodes that correspond to each peer fabric node of the plurality of peer fabric nodes, and are configured to communicate with at least one host system using the network fabric protocol; means for sending, from a target subsystem fabric node of the corresponding plurality of subsystem fabric nodes, an updated discovery log configured to identify a plurality of fabric subsystem addresses; means for receiving, by a corresponding peer fabric node of a plurality of peer fabric nodes that corresponds to the target subsystem fabric node, the updated discovery log; means for sending, by the corresponding peer fabric node and responsive to receiving the updated discovery log, the updated discovery log to each other peer fabric node of the plurality of peer fabric nodes; and means for sending, by the corresponding peer fabric node and responsive to receiving the updated discovery log, the updated discovery log to each other subsystem fabric node of the corresponding plurality of subsystem fabric nodes.

The various embodiments advantageously apply the teachings of distributed storage networks and/or systems to improve the functionality of such computer systems. The various embodiments include operations to overcome or at least reduce the issues previously encountered on the storage networks and/or systems and, accordingly, are more reliable and/or efficient than other computing networks. That is, the various embodiments disclosed herein include hardware and/or software with functionality to improve the management of subsystem discovery by host systems, such as by using synchronized discovery logs distributed among storage subsystems. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
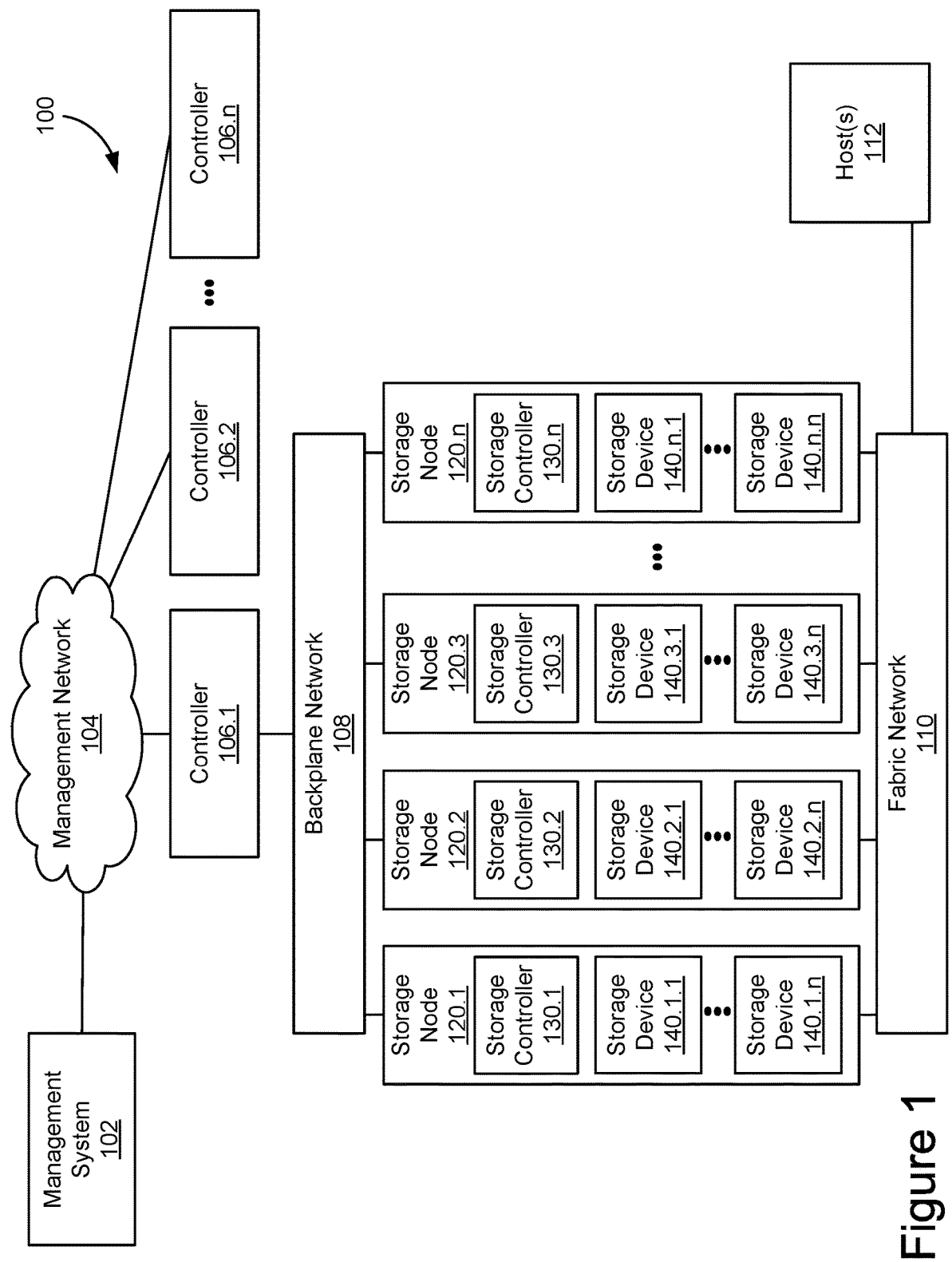
FIG. 1 schematically illustrates a distributed storage system with a fabric network interface.

FIG. 1 shows an embodiment of an example data storage system 100 with fabric connected data storage devices 140. While some example features are illustrated, various other features have not been illustrated for the sake of brevity and so as not to obscure pertinent aspects of the example embodiments disclosed herein. To that end, as a non-limiting example, data storage system 100 includes one or more data storage devices 140 (also sometimes called information storage devices, storage devices, or disk drives) configured in storage nodes 120. In some embodiments, storage nodes 120 may be configured as blades or similar storage units for use in data center storage racks or chassis. Storage nodes 120 may be supported by a management system 102 and provide data storage and retrieval capabilities for host systems 112. In some embodiments, storage nodes 120 may be configured in a storage hierarchy that includes controllers 106. Each controller 106 may be responsible for a corresponding set of storage nodes and storage devices connected through a corresponding backplane network, though only storage nodes 120 and storage devices 140 for controller 106.1 are shown.

In the embodiment shown, each storage node 120 includes a number of storage devices 140 attached to a common fabric network 110. For example, storage devices 140 may include a number of disk drives arranged in a storage array, such as storage devices sharing a common rack or unit in a data center. In some embodiments, storage devices 140 may share backplane network 108, network switch(es), and/or other hardware and software components. For example, backplane network 108 and fabric network 110 may include a plurality of physical port connections to storage nodes 120, storage controllers 130, and storage devices 140 that define physical, transport, and other logical channels for establishing communication with the different components and subcomponents thereof. related to interconnect fabric 114. In some embodiments, peer groups may not be collocated in the same unit, rack, data center, or geography. In some embodiments, backplane network 108 may provide a plurality of physical connections to storage nodes 120 via storage controllers 130 that enable management system 102 to manage storage nodes 120 via a management network 104 and controllers 106. These physical connections may include one or more ethernet connections and management network 104 may include a secure subnetwork through various network switches, network interfaces, and similar networking components.

Management system 102 may be configured as an application or module in an information technology (IT) management system running on a general-purpose computer, such as such as a personal computer, a laptop, a tablet, a wireless telephone, a personal digital assistant or any other type of communication device that is able to interface with the storage system 100 and/or operational data about storage system 100 over management network 204. In some embodiments, management application 250 may provide a dashboard for system maps, configuration information, operating data, system/component diagnostics, performance metrics, and/or status information for storage devices 140, storage controllers 130, storage nodes 120, controller nodes 106, etc. For example, management system 102 may include a web-based graphical user interface accessed through a web browser using secure internet protocols that accesses specific management functions of each of the components of storage system 100. In some embodiments, management application 250 may include a configuration utility for managing the configuration of storage devices 140, storage controllers 130, controllers 106, and other components of storage system 100 as fabric nodes accessible using fabric communication protocols and fabric subsystem addresses. Management application 250 may support a number of administrators with varying IT management responsibilities, including provisioning, maintenance, data management, equipment management, and related scheduling, costing, and project management.

Several storage nodes 120 can be grouped together with an associated controller 160, such as storage nodes 120.1-120.n sharing a backplane connection through backplane network 108 with controller 106.1. For example, these components may be housed in a single rack with associated backplane interfaces. Similarly, each controller 106.2-106.n may be associated with another rack and another set of storage nodes. These racks may not be required to be located at the same location. They may be geographically dispersed across different data centers. For example, controller 106.1 and associated storage nodes 120.1-120.n may be located in a rack at a data center in Europe, controller 106.2 and associated storage nodes may be located in a rack at a data center in the USA, and controller 106.n and associated storage nodes may be located in a rack at a data center in China. Similarly, these racks may be interconnected by a variety of network architectures and may include multiple network paths, global networks (e.g., internet), private networks, virtual networks, subnetworks, etc. and related networking equipment. These distributed rack components may be interconnected to management network 104 and/or fabric network 110.

In some embodiments, the data storage devices 140 are, or include, solid-state drives (SSDs). Each data storage device 140.1.1-140.n.n may include a non-volatile memory (NVM) or device controller based on compute resources (processor and memory) and a plurality of NVM or media devices for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, data storage devices 140 may each be packaged in a housing, such as a multi-part sealed housing with a defined form factor and ports and/or connectors for interconnecting with backplane network 108 and/or fabric network 110.

In some embodiments, a respective data storage device 140 may include a single medium device while in other embodiments the respective data storage device 140 includes a plurality of media devices. In some embodiments, media devices include NAND-type flash memory or NOR-type flash memory. In some embodiments, data storage device 140 includes one or more hard disk drives (HDDs). In some embodiments, data storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, storage controllers 130 may be coupled to respective data storage devices 140 through an interface bus within each storage node 120. For example, each storage mode may be configured as a storage blade or similar storage unit comprising a plurality of interface slots for storage devices 140. Storage controllers 130 may include NVMe-oF interface cards with interface ports for NVMe-oF compatible storage devices, such as storage devices with NVMe interfaces and onboard remote direct memory access (RDMA) engines. In some embodiments, storage controllers 130 may be coupled to respective data storage devices 140 through backplane network 108 and/or fabric network 110. However, in some embodiments, storage controllers 130 may be hosted as a component and/or a subsystem of another component of data storage system 100. For example, in some embodiments, some or all of the functionality of storage controllers 130 may be implemented by software executed on one or more compute resources in at least one of data storage devices 140, backplane network 108, fabric network 110, and/or physical interfaces or networking components thereof. Storage controllers 130 and/or controllers 106 are sometimes called a controller system, a main controller system, a non-volatile memory express (NVMe) controller, garbage collection (GC) leader, or storage virtualization controller (SVC).

In some embodiments, host or host system 112 is coupled to data storage system 100 through a network interface that is part of host fabric network 110. In some embodiments, multiple host systems 112 (only one of which is shown in FIG. 1) are coupled to data storage system 100 through fabric network 110, which may include a storage network interface or other interface capable of supporting communications with multiple host systems 112. Fabric network 110 may include a wired and/or wireless network (e.g., public and/or private computer networks in any number and/or configuration) which may be coupled in a suitable way for transferring data. For example, fabric network 110 may include any means of a conventional data communication network such as a local area network (LAN), a wide area network (WAN), a telephone network, such as the public switched telephone network (PSTN), an intranet, the internet, or any other suitable communication network or combination of communication networks.

Host system 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 112 is sometimes called a host, client, or client system. In some embodiments, host system 112 is a server system, such as a server system in a data center. In some embodiments, the one or more host systems 112 are one or more host devices distinct from controllers 106, storage nodes 120, storage controllers 130, and the plurality of storage devices 140. The one or more host systems 112 may be configured to store and access data in the plurality of storage devices 140.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Fabric network 110 may include or employ one or more interfaces, routers, and physical connections to each component or subcomponent physically and logically connected to fabric network 110. Fabric network 110 may be defined in terms of fabric nodes communicating with one another through fabric network 110 using a fabric network protocol, such as NVMe-oF. In some embodiments, fabric nodes may be organized as system nodes and subsystem nodes, where subsystem nodes include addressable storage resources and system nodes include subsystem management resources. Fabric network 110 may support a data connection to each subsystem fabric node, but typically conveys commands in addition to data, and optionally conveys metadata, error correction information and/or other information in addition to data values to be stored in storage devices 140 and data values read from storage devices 140.

In some embodiments, each storage device 140 includes a device controller, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices are coupled to the device controllers through connections that typically convey commands in addition to data, and optionally convey metadata, error correction information and/or other information in addition to data values to be stored in media devices and data values read from media devices. Media devices may include any number (i.e., one or more) of memory devices including, without limitation, non-volatile semiconductor memory devices, such as flash memory device(s).

In some embodiments, media devices in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

Figure 2:
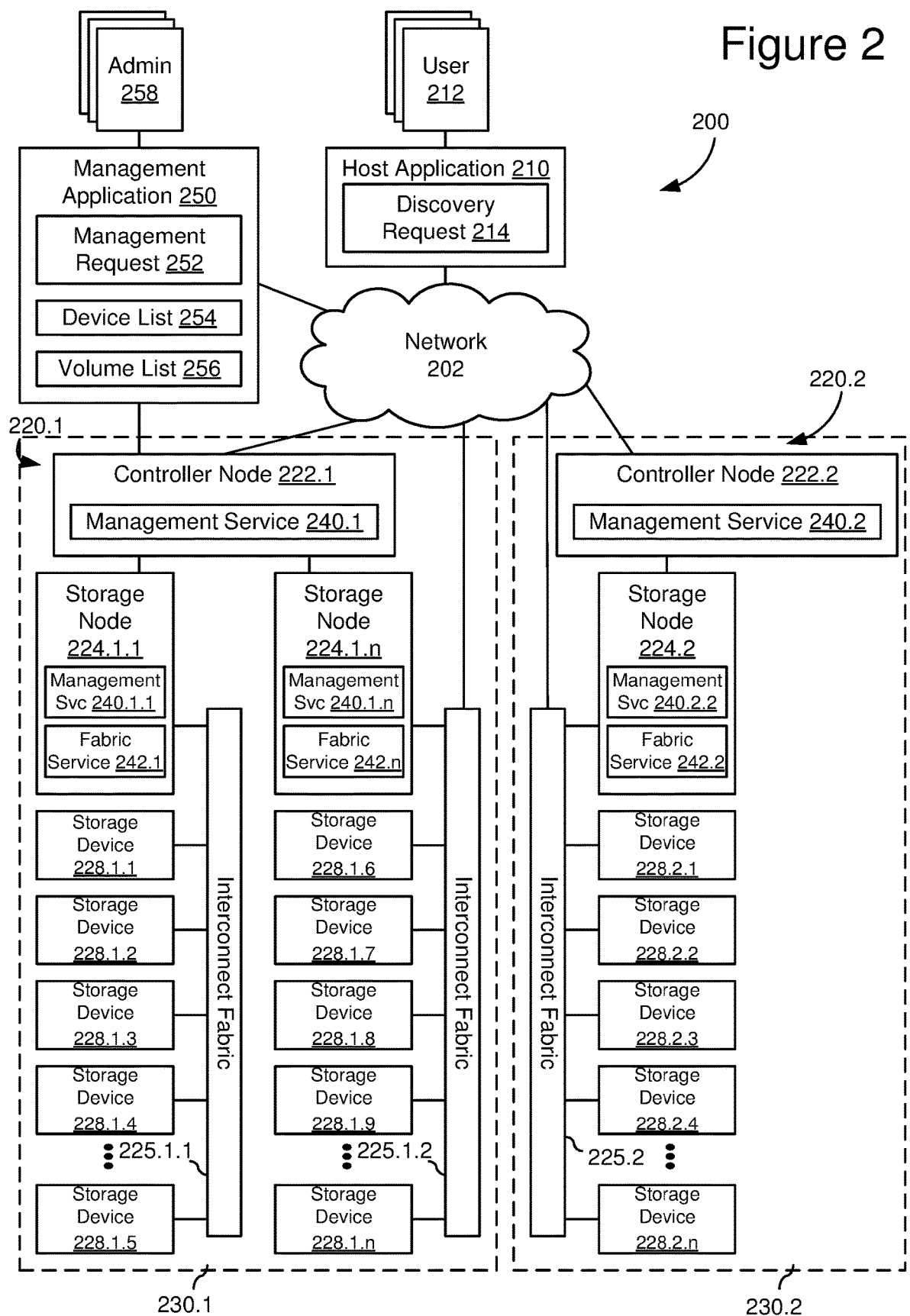
FIG. 2 schematically illustrates a fabric architecture that may be used by the distributed storage system of FIG. 1.

FIG. 2 shows an embodiment of an example storage system 200, such as a global storage system implementing distributed storage systems 230 in different locations 220. Storage system 200 may be implemented as a plurality of distributed storage systems 230 which is coupled to a host application 210 for accessing, storing, and using data stored in storage system 200. Storage system 200 may include a plurality of storage devices 228 configured as components of the disaggregated storage systems. Administrators 258 may have various responsibilities for storage system 200 and use a network-based management application 250 to configure, monitor, and control data volume access across storage system 200.

The connection between storage system 200 and host application 210 could, for example, be implemented as a suitable data communication network 202, such as a LAN, WAN, internet, etc. Application 210 could, for example, be a dedicated software application running on a computing device, such as a server, a personal computer, a laptop, a wireless telephone, a personal digital assistant or any other type of communication device that is able to interface with the storage system 200. In some embodiments, application 210 could, for example, comprise a suitable file system which enables a general-purpose software application to interface with storage system 200, an application programming interface (API) library for the storage system 200, etc. In some embodiments, application 210 may be a user application, such as business or personal application instantiated in a local, client/server, web, and/or mobile application that enables users 212 to interact with data stored in storage system 200.

In some embodiments, host application 210 may be configured to identify storage volumes configured in storage system 200. For example, host application 210 may be hosted on a computing system configured as a fabric node that may send a discovery request 214 to one or more fabric nodes in storage system 200. For example, controller nodes 222 may be configured as fabric nodes running management services 240 and/or storage nodes 224 may be configured as fabric nodes running fabric services 242. In some embodiments, host application 210 may have previously identified one or more fabric nodes and corresponding subsystem addresses and/or been configured manually with a fabric subsystem address for one of the fabric services 242. Each fabric service 242 may run a discovery controller configured to receive discovery request 214 and each discovery controller may include a synchronized discovery log with subsystem address information for all fabric subsystem nodes in storage system 200. Any fabric service 242 receiving discovery request 214 may respond with the most current or updated discovery log for the fabric subsystems in storage system 200. This may enable host application 210 to use a single discovery request 214 to any target fabric node to receive fabric subsystem mapping information for the entire storage system. In some embodiments, management services 240 may assist in synchronizing the discovery logs across all fabric services 242, as further explained below.

As further shown in FIG. 2, storage system 200 comprises two storage locations 220. Each storage location 220 may include a controller node 222 and one or more storage nodes 224 which may be coupled in a suitable way for transferring data, for example by means of interconnect fabrics 225. Each of storage nodes 224 may further connect to a plurality of storage devices 228 arranged in storage arrays. Controller nodes 222, storage nodes 224, and storage devices 228 may connect to the data communication network 202 and each other by means of suitable wired, wireless, optical, etc. network connections or any suitable combination of such network connections.

Although the example of Figures shows only two controller nodes 222, three storage nodes 224, three storage arrays 226, and fifteen storage devices 228, storage system 200 could comprise any other suitable number of controller nodes 222, storage nodes 224, and storage devices 228 arranged in any number of storage arrays 226. Controller nodes 222 in storage system 200 may be peer controller nodes and may be configured as peer fabric nodes for fabric-based communication and synchronizing discovery logs across their respective storage nodes.

Controller nodes 222 and storage nodes 224 can be built as general-purpose computers, however more frequently they are physically adapted for arrangement in large data centers, where they are arranged in modular racks comprising standard dimensions. Exemplary controller nodes 222 and storage nodes 224 may be dimensioned to take up a single unit of such rack, which is generally referred to as 1U.

Such an exemplary storage node 224 may use a low-power processor and may be equipped with ten or twelve storage device, such as high capacity serial advanced technology attachment (SATA), small computer system interface (SCSI), serial attached SCSI (SAS), fibre channel (FC), non-volatile memory express (NVMe), etc., storage devices 228 (even though only five storage devices 228 are shown for each storage node 224) and is connectable to the network over redundant Ethernet network interfaces. In some embodiments, storage nodes 224 may include a compute complex providing storage controller or other storage-related functionality.

An exemplary controller node 222 may comprise a management controller or a high-end server including management controller functions and provide network access to applications 210 and/or management application 250 over multiple high bandwidth Ethernet network interfaces. Data can be transferred between applications 210 and such a controller node 222 by means of a variety of network protocols, including transmission control protocol (TCP), remote direct memory access (RDMA), RDMA over converged Ethernet (RoCE), NVMe over fabric (NVMe-oF), hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 224. In some embodiments, HTTP/REST protocols complying with S3 may enable data transfer through a REST application protocol interfaces (API). Preferably, such controller nodes 222 operate as a highly available cluster of host nodes, and provide for example shared access to the storage nodes 224, metadata caching, protection of metadata, etc. In some embodiments, management application 250 may communicate with controller nodes 222 using similar network protocols to host application 210, but using a subnetwork configuration that separates a logical management network from the fabric data network supporting host application 210.

Several storage nodes 224 can be grouped together, for example because they are housed in a single rack, a single chassis, or a single physical location 220.1. For example, storage nodes 224.1.1 to 224.1.n may be grouped in physical location 220.1 and support host node 202.1, while storage node 224.2 may be located in physical location 220.2 and support host node 202.2. These physical locations 220 are not required to be located at the same geographic location, they are often geographically dispersed across different data centers. For example, physical location 220.1 can be located at a data center in Europe and physical location 220.2 at a data center in China.

In some embodiments, management application 250 may include a user interface for configuring storage devices 228 and storage volumes they contain. For example, management application 250 may be configured to issue a management request 252 to management services 240 in controller nodes 222 for configuring or changing storage volumes defined in storage nodes 224. In some embodiments, management application 250 may be an out of band, REST API compliant tool, hosted on a computing device via web browser, a command line interface tool, or orchestration tool like OpenStack. Management application 250 may include logic and data structures for generating management request 252 with parameters for a configuration operation. Example management requests may include "create a volume with hosts mapping" or other requests to delete, modify, etc. a target volume or related host mapping information. Management application 250 may manage or access fabric device list 254 and/or storage volume list 256 to assist in managing storage volume configurations. For example, fabric device list 254 may include a data structure, such as a table, describing the physical devices and fabric nodes comprising storage system 200. Storage volume list 256 may include a data structure, such as a table, describing each previously defined storage volume configured in storage system 200, with related hosts mapping information. In some embodiments, management application 250 may send management request 252 to management services 240 on controller nodes 222 for routing to their respective storage nodes 224 and fabric services 242.

Figure 3:
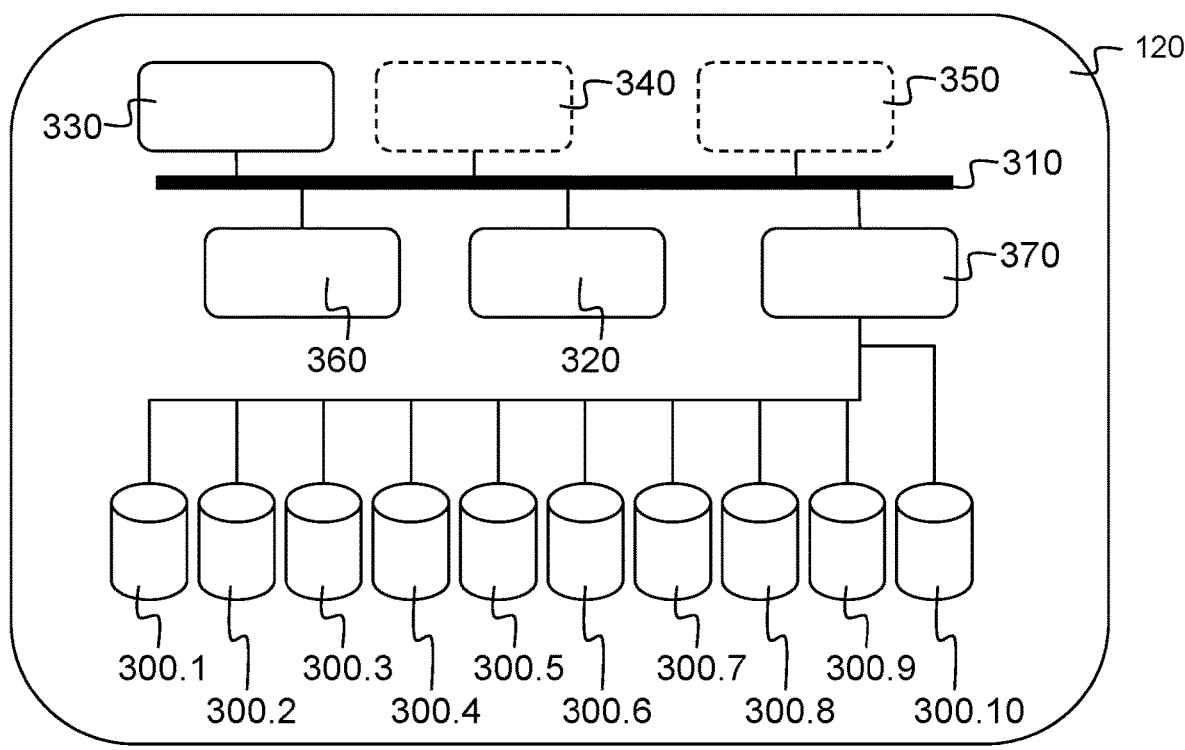
FIG. 3 schematically illustrates a storage node of the distributed storage system of FIG. 1.

FIG. 3 shows a schematic representation of one of the storage nodes 120. Storage node 120 may comprise a bus 310, a processor 320, a local memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller or backplane management controller, such as storage controllers 130. Bus 310 may include one or more conductors that permit communication among the components of storage node 120. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 120, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 120 to communicate with other devices and/or systems, for example mechanisms for communicating with other storage nodes 120 or controller nodes 106 such as for example two 1 gigabit (Gb) Ethernet interfaces. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 140, for example, 2 terabyte (TB) SATA-II disk drives or 2 TB NVMe solid state drives (SSDs), and control the reading and writing of data to/from these storage elements 300. As shown in FIG. 3, such a storage node 120 could comprise ten 2 TB SATA-II disk drives as storage elements 300.1-300.10 and in this way storage node 120 would provide a storage capacity of 20 TB to the storage system 100.

Taking into account FIG. 1 and FIG. 3, the storage system 100 may comprises a plurality of storage elements 300. The storage nodes 120 each comprise a share of these storage elements 300. Each storage nodes 120 could comprise a similar amount of storage elements, but this is, however, not essential. Storage node 120 could for example comprise four, eight, ten, or any other number of storage elements appropriate to interface and form factor constraints. The storage system 100 may be operable to store and retrieve a data objects, data blocks, data files, or other data units comprising data, for example, 64 megabytes (MB) of binary data and a location or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces such as for example different revisions of SATA, SAS, FC, NVMe, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
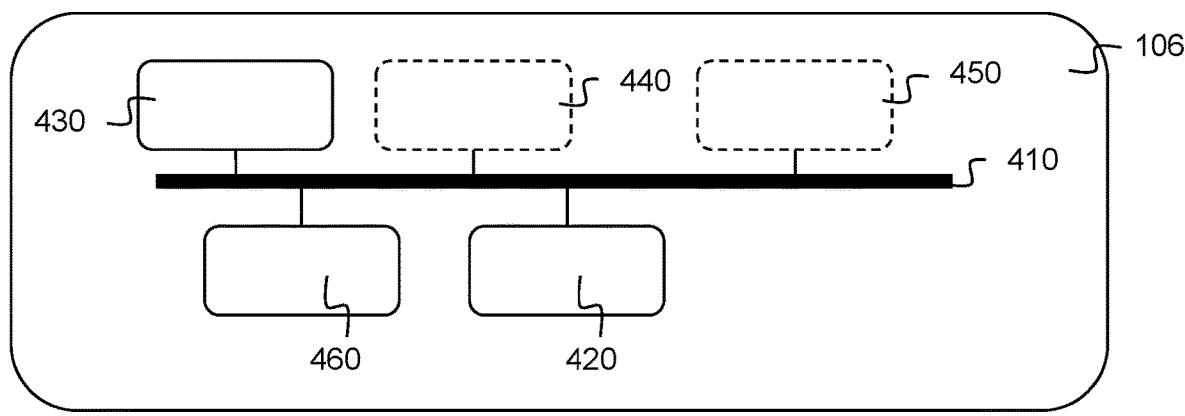
FIG. 4 schematically illustrates a controller node of the distributed storage system of FIG. 1.

FIG. 4 shows a schematic representation of the controller nodes 106. Controller node 106 may comprise a bus 410, a processor 420, a local memory 430, one or more optional input units 440, one or more optional output units 450, and a communication interface 460. Bus 410 may include one or more conductors that permit communication among the components of controller node 106. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to said controller node 106 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables controller node 106 to communicate with other devices and/or systems, for example mechanisms for communicating with other storage nodes 120 or controller nodes 106 such as for example two 10 Gb Ethernet interfaces.

Controller node 106 could have an identical design as a storage node 120, or one of the storage nodes 120 of the storage system could perform both the function of a controller node 106 and a storage node 120. Further, the device on which management system 102 or hosts 112 run may be a controller node 106.

Figure 5:
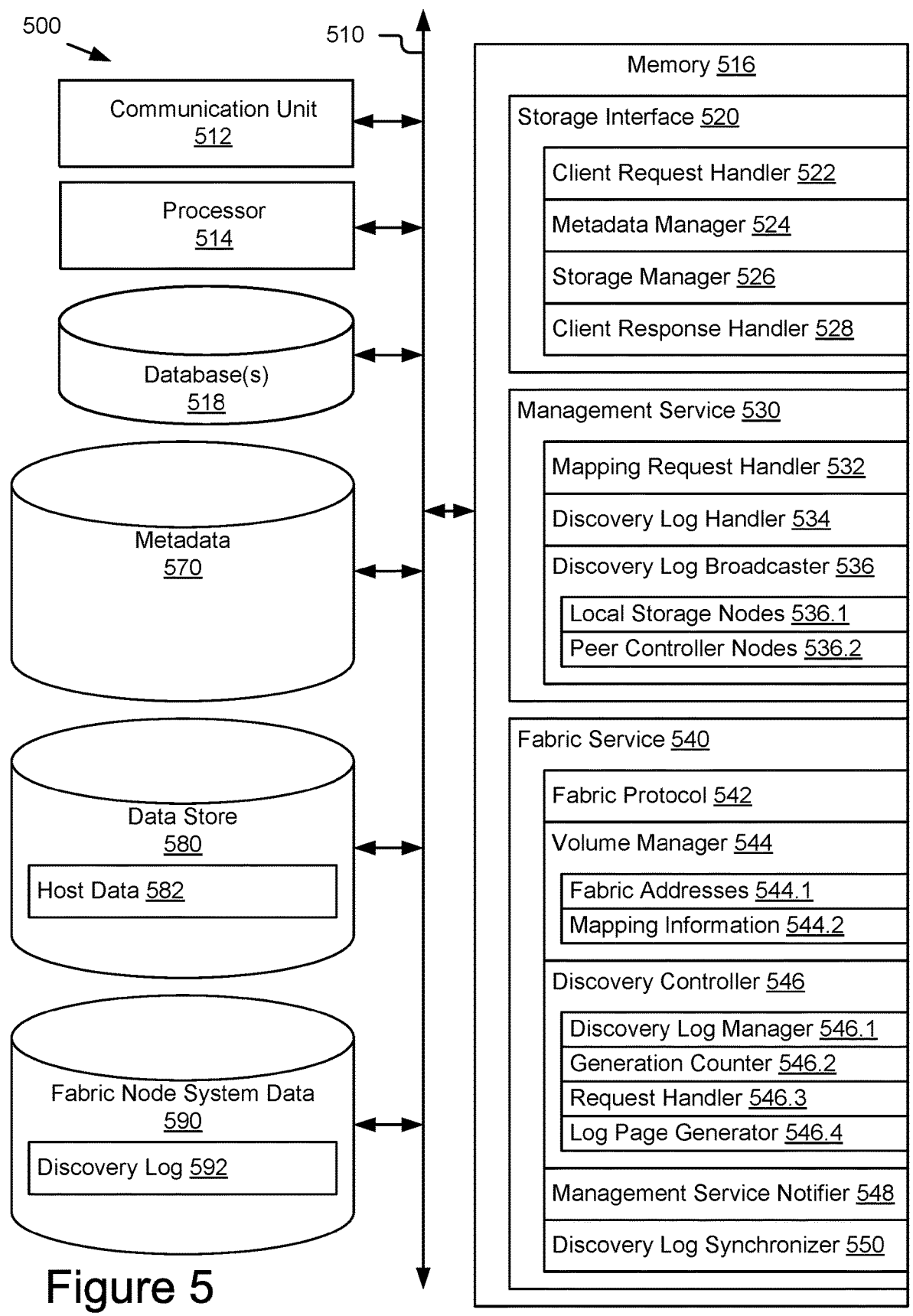
FIG. 5 schematically illustrates some elements of the nodes of FIG. 1-5 in more detail.

FIG. 5 schematically shows selected modules of a controller node, storage node, and/or access node configured in a fabric network with fabric node and storage management functions for distributed data storage and access. Storage system 500 may be configured as a node with an architecture and/or hardware similar to controller node and/or storage node. Storage system 500 may incorporate elements and configurations similar to those shown in FIGS. 1-4. For example, storage system 500 may be configured in a controller node 106 with storage management functions and metadata store 570 and/or data store 580 may be embodied in one or more storage nodes 120 in communication with controller node 106. In some embodiments, storage interface 520 and management service 530 may be embodied in controller nodes 106 and fabric service 540 may be embodied in storage nodes 120.

Storage system 500 may include a bus 510 interconnecting at least one communication unit 512, at least one processor 514, and at least one memory 516. Bus 510 may include one or more conductors that permit communication among the components of storage system 500. Communication unit 512 may include any transceiver-like mechanism that enables storage system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Storage system 500 may include or have access to one or more databases and/or specialized data stores, such as metadata store 570, host data store 580, and/or fabric node system data 590. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects or other data host units 582 stored in host data store 580. In some embodiments, data store 580 may include data objects comprised of object data (such as host data), some amount of metadata (stored as metadata tags), and a GUID. Metadata store 570, host data store 580, and/or other databases or data structures may be maintained and managed in separate computing systems, such as storage nodes, with separate communication, processor, memory, and other computing resources and accessed by storage system 500 through data access protocols. Metadata store 570 and data store 580 may be shared across multiple storage systems 500. In some embodiments, each instance of fabric service 540 and/or management service 530 may maintain a local instance of fabric node system data 590, such as a configuration file in local storage or memory of their respective controller nodes 106 or storage nodes 120.

Storage system 500 may include a plurality of modules or subsystems that are stored and/or instantiated in memory 516 for execution by processor 514. For example, memory 516 may include a storage interface 520 configured to receive, process, and respond to object data requests from client or host systems or other nodes in distributed storage system 100. Memory 516 may include a management service 530 configured to manage fabric communication among fabric nodes, particularly synchronization of discovery logs. Memory 516 may include a fabric service 540 configured to manage configuration and execution of fabric communications at each fabric node, including discovery controller functions.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects or data blocks and their respective client or host data and metadata in accordance with the protocols of an object storage system or a block storage system. In some embodiments, storage interface 520 may enable direct memory access and/or access over NVMe protocols to host data units 582 stored in data store 580. In a fabric-based, disaggregated storage system, the functions of storage interface 520 may be distributed across nodes to provide flexibility and scalability of storage and storage management resources. Communication among these nodes, including communication with client or host nodes, may be conducted using fabric protocols enabled by fabric management service 530 and fabric service 540. In some embodiments, one or more functions of storage interface 520 may be managed at the host level.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or host data operations handled by storage manager 526. The results of these operations may be processed, formatted, and returned by client response handler 528.

Client request handler 522 may include an interface and/or communication event-based condition for receiving data requests from one or more clients. For example, client systems may send an object data request over a network connection and addressed to storage system 500 or a port or component thereof. Client request handler 522 may receive these requests and parse them according to the appropriate communication and storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing host file metadata, such as object metadata and/or logical block address (LBA) maps. For example, when a new object is written to host data store 580, at least one new metadata entry may be created in metadata store 570 to represent parameters describing or related to the newly created object. Metadata manager 524 may generate and maintain one or more data indexes that enable metadata manager 524 to locate metadata within metadata store 570. In some embodiments, metadata manager 524 may also manage file, block, or object metadata stored in host data store 580 with host data units 582. Metadata manager 524 may work in conjunction with storage manager 526 to create, modify, delete, access or otherwise manage metadata stored as tags or headers within data store 580.

Storage manager 526 may include interfaces, functions, and/or parameters for reading, writing, and deleting host data units 582 in data store 580. For example, PUT or write commands may be configured to write host data units to data store 580. GET or read commands may be configured to read data from data store 580. DELETE commands may be configured to delete data from data store 580, or at least mark a data object for deletion until a future garbage collection or similar operation actually deletes the data or reallocates the physical storage location to another purpose.

Other storage commands may be handled by storage manager 526. Storage commands processed by storage manager 526 may include parameters for accessing special functions and/or metadata resources stored with host or client data. Storage manager 526 may work in conjunction with metadata manager 524 for managing metadata, including versioning information. In erasure encoded systems, storage manager 526 may operate in conjunction with encoders, block spreaders, block clusterers, and decoders for encoding and decoding data objects in redundant and distributed data blocks in accordance with an erasure coding configuration or other data redundancy method. For example, storage manager 526 may use an encoder and block spreader to write data to data store 580 and use a block clusterer and decoder to read data from data store 580.

Client response handler 528 may include an interface and/or communication logic for sending response messages, such as result, status, or error messages, to one or more clients or hosts related to object data requests received. For example, client response handler 528 may wait for processing by metadata manager 524 and/or storage manager 526 to complete or generate an error, and then provide an appropriate result or error message to the client system(s) for each data request received In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded database.

Management service 530 may include an interface protocol and set of functions and parameters for receiving, defining, and otherwise managing network communication and related fabric node configurations for storage system 500 and/or a broader distributed storage system. For example, management service 530 may include functions for configuring fabric nodes and fabric subsystem nodes for defined subsystem addresses, storage volumes, and host mappings. In some embodiments, management service 530 may also manage synchronization of discovery logs across fabric subsystem nodes. For example, management service 530 may receive updated discovery logs from another fabric node and distribute or broadcast the updated discovery log to the fabric subsystem nodes associated with its management services and/or one or more peer fabric nodes in the same distributed storage system. Each peer fabric node may host a similar management service to receive the updated discovery log and distribute the updated log to their associated fabric subsystem nodes. In some embodiments, each instance of management service 530 may be associated with a plurality of other fabric nodes running fabric service 540 and receiving mapping requests from a management application, such as management application 250 in FIG. 2, through management service 530. For example, management service 530 may be hosted on a controller, such as a backplane management controller for a particular rack, and the associated fabric subsystem nodes may by storage controllers, such as the storage controllers in the storage blade units installed in that rack, each hosting an instance of fabric service 540.

In some embodiments, management service 530 may include a plurality of hardware and/or software modules configured to use processor 514 and memory 516 to handle or manage defined operations of management service 530. For example, management service 530 may include a mapping request handler 532, a discovery log handler 534, and a discovery log broadcaster 536. For example, mapping request handler 532 may be configured to receive mapping request messages from a management application that includes a fabric configuration tool or interface and route those mapping request messages to a target subsystem fabric node. Discovery log handler 534 may be configured to receive updated discovery logs from associated fabric subsystem nodes and/or peer fabric nodes and store the updated discovery log as a discovery log record 592 in fabric node system data 590. In some embodiments, discovery log handler 534 may operate in conjunction with a discovery controller 546 of a fabric service hosted on the same fabric node as management service 530. Discovery log broadcaster 536 may be configured to broadcast updated discovery logs to other fabric nodes, such as associated fabric subsystem nodes and peer fabric nodes. In some embodiments, discovery log record 592 may be a master discovery log record that includes discovery log entries for all storage volumes and fabric subsystem nodes in a distributed storage system. For example, fabric subsystem addresses and host mapping information for all storage volumes for all host systems may be included in discovery log record 592.

Mapping request handler 532 may include data structures, functions, and interfaces for receiving and routing mapping request messages from a fabric management application to one or more target subsystem fabric nodes. For example, a mapping request message may include a storage volume creation command to define a new volume in a target storage node for access by one or more corresponding host systems. Mapping request handler 532 may identify the target storage node from the mapping request and route the mapping request message and/or command parameters therefrom to the target subsystem fabric node. In some embodiments, mapping request handler 532 may also manage command status and response messages from the target subsystem fabric node to the fabric management application that initiated the mapping request. Mapping request handler 532 may handle a variety of mapping request types, such as create, delete, and change/modify commands. For example, a mapping request message may include a host mapping change that changes the host mapping information for an identified storage volume but does not modify the storage volume identifier or subsystem fabric address for accessing that storage volume over the network fabric.

Discovery log handler 534 may include data structures, functions, and interfaces for receiving and storing discovery logs for synchronization across fabric nodes. For example, discovery log handler 534 may receive an updated discovery log from the target subsystem fabric node after it has executed the mapping request sent by mapping request handler 532. Discovery log handler 534 may also receive updated discovery logs from other fabric nodes that have updated their discovery logs or received an updated discovery log from an associated subsystem fabric node. For example, peer fabric nodes may be configured to broadcast updated discovery logs to each other peer fabric node as further described with regard to discovery log broadcaster 536. Discovery log handler 534 may receive discovery logs as the payload in a fabric system message from the subsystem fabric node or peer fabric node. In some embodiments, discovery log handler 534 may use a discovery request to the target subsystem fabric node to receive the updated discovery log after completion of a mapping request, such as in response to a mapping request complete message from the target subsystem fabric node. Discovery log handler 534 may be configured to store received discovery logs in discovery log records 592 in fabric node system data 590 for the fabric node hosting management service 530. In some embodiments, management service 530 may be collocated in a fabric node with fabric service 540 and may access discovery controller 546 for storing or otherwise managing received discovery logs.

Discovery log broadcaster 536 may include data structures, functions, and interfaces for broadcasting updated discovery logs to other fabric nodes, such as associated fabric subsystem nodes and peer fabric nodes. For example, responsive to discovery log handler 534 receiving an updated discovery log, discovery log broadcaster 536 may broadcast the updated discovery log to other fabric nodes for use by their discovery controllers and/or rebroadcasting to additional fabric nodes. Discovery log broadcaster 536 may be configured to read discovery log record 592 and package the discovery log data in an updated discovery log message. Discovery log broadcaster 536 may send the updated discovery log message to local storage nodes 536.1, where each local storage node comprises a fabric node hosting instances of fabric service 540 and configured or configurable as subsystem fabric nodes for specific storage volumes. Local storage nodes 536.1 may be located in the same rack or an otherwise defined set of storage nodes accessible through the node hosting management service 530. Discovery log broadcaster 536 may send the updated discovery log message to peer controller nodes 536.2, where each peer controller node comprises a fabric node hosting instances of management service 530 and configured to rebroadcast the updated discovery log to their associated subsystem fabric nodes. In some embodiments, discovery log broadcaster 536 may use a generation counter in or otherwise associated with the discovery log to determine the most recent updated discovery log and selectively distribute only the most up-to-date discovery log to local storage nodes 536.1 and peer controller nodes 536.1. In some embodiments, local storage nodes 536.1 and/or peer controller nodes 536.2 may be identified in corresponding data structures, such as lists or tables, in management service 530 and/or fabric node system data 590 for use in identifying destination fabric nodes and corresponding addresses for discovery log broadcaster 536. The fabric nodes corresponding to local storage nodes 536.1 and/or peer controller nodes 536.2 may be discovered and maintained by a management path or management network using dynamic detection of the peer storage racks and the fabric nodes. The fabric nodes targeted by discovery log broadcaster 536 may be identified and maintained regardless of whether the storage system uses static or dynamic internet protocol (IP) configurations.

Fabric service 540 may include an interface protocol and set of functions and parameters for receiving, sending, and otherwise managing network communication for a particular fabric node. For example, each fabric node may be configured to run fabric service 540 to provide fabric-based communication and access to resources on that node, such as each storage node and/or controller node. In some embodiments, fabric service 540 may include configuration functions for creating and modifying host storage volumes on fabric nodes that include host storage resources, such as storage nodes 224 in FIG. 2. Fabric service 540 may also maintain and publish discovery logs to host systems in response to discovery requests. In some embodiments, fabric service 540 may participate in discovery log synchronization be notifying management service 530 of updated discovery logs and receiving and storing updated discovery logs from synchronization messages.

In some embodiments, fabric service 540 may include a plurality of hardware and/or software modules configured to use processor 514 and memory 516 to handle or manage defined operations of fabric service 540. For example, fabric service 540 may include a fabric protocol 542, a volume manager 544, a discovery controller 546, a management service notifier 548, and a discovery log synchronizer 550. For example, fabric protocol 542 may be configured to provide the interface definitions, addressing, and messaging formats for fabric communication with other fabric nodes. Volume manager 544 may be configured to process mapping requests to define storage volumes with fabric addresses and host mapping information. Discovery controller 546 may be configured to update and store discovery logs and provide them to host systems in response to discovery requests. Management service notifier 548 may be configured to notify management service 530 on a node designated for synchronizing discovery logs with a particular instance of fabric service 540. Discovery log synchronizer 550 may be configured to receive, verify, and store updated discovery logs from other fabric nodes, such as through management service 530 on the node designated for synchronizing discovery logs with that instance of fabric service 540.

Fabric protocol 542 may include data structures, functions, and interfaces for communicating with other fabric nodes. For example, fabric protocol 542 may include the interface definitions, addressing, and message handling to send and receive fabric communications over a fabric network. In some embodiments, fabric protocol 542 may be configured as a network fabric protocol for a fabric communication and memory access standard, such as NVMe-oF. For example, each storage node may run interface logic defined by the NVMe-oF standard for accessing RDMA data buffers in the storage nodes and/or storage devices they contain for storing and accessing host data based on host data requests. In some embodiments, other fabric protocols that support discovery requests to fabric nodes for accessing address and mapping information in discovery logs may be used. In some embodiments, fabric protocol 542 may enable connection to administrative and/or input/output queues associated with a subsystem accessible through the fabric node from host or controller systems.

Volume manager 544 may include data structures, functions, and interfaces for managing storage volumes for the storage node hosting fabric service 540. For example, volume manager 544 may receive host mapping requests and/or host mapping parameters and update one or more data structures for configuring storage volumes in the storage node. In some embodiments, volume manager 544 may include one or more fabric addresses for 544.1 for storage resources accessible through fabric service 540. For example, volume manager 544 may include a qualified subsystem name and a port identifier for each subsystem hosting a storage volume or other namespace. Volume manager 544 may also include mapping information 544.2 that associates each storage volume with one or more host systems configured to access those storage volumes. In some embodiments, volume manager 544 may be configured to maintain the system parameter data necessary to enable selective access to defined storage volumes by selected host systems. The interface protocols for accessing the storage resources defined for a storage volume from the host systems may include additional layers of verification and security beyond the fabric addresses 544.1 and associated host mapping information 544.2. In some embodiments, volume manager 544 may process a host mapping request message and return a host mapping status message, such as host mapping complete or an appropriate error message. Volume manager 544 may pass new or updated fabric address and/or host mapping parameters to discovery controller 546 for updating discovery logs based on the completed mapping request.

Discovery controller 546 may include data structures, functions, and interfaces for allowing hosts to determine the fabric subsystems that include storage volumes or other namespaces accessible to the host system. For example, discovery controller 546 may enable host systems to request and receive a discovery log page that lists the subsystem fabric nodes and storage volumes accessible to the requesting host, along with corresponding addresses and other routing information. In some embodiments, discovery controller 546 is an addressable service configured to receive a discovery request identifying the host system name and return a discovery log page including entries for each subsystem configured for a storage volume mapped to the host system name. In some embodiments, each storage node or storage target includes discovery controller 546 as part of fabric service 540, without any separate discovery servers. In some embodiments, a discovery log manager 546.1 may be configured to update a discovery log record 592 in fabric node system data 590. For example, when volume manager 544 creates or modifies a storage volume definition, a new discovery log entry may be generated for the newly defined storage volume and added to discovery log record 592.

Generation counter 546.2 may increment a generation counter value in response to any change to the discovery log, such as the addition or change of a discovery log entry in discovery log record 592. The generation counter value may be included in any discovery log updates provided for synchronization, as well as discovery log pages provided to host systems in response to discovery requests. Discovery controller 546, discovery log handler 534, and host systems may use the generation counter value to assure that they are using entries from the most current discovery log (e.g., the discovery log record or discovery log page with the highest generation counter value.

Request handler 546.3 may process discovery requests from host systems. Discovery request messages received by discovery controller 546 may be received and validated in accordance with fabric protocol 542. In some embodiments, request handler 546.3 may parse the host name from the discovery request and log page generator 546.4 may generate a discovery log page from entries in the discovery log corresponding to storage volumes mapped to the host name. For example, log page generator 546.4 may filter discovery log record 592 for entries containing the host name in the host mapping information and generate a discovery log page including only those log entries and the current generation counter value for the discovery log. Request handler 546.3 may return the discovery log page to the host system that initiated the request.

Management service notifier 548 may include data structures, functions, and interfaces for notifying a management service responsible for discovery log synchronization of updates to the discovery log. For example, responsive to volume manager 544 making a change to the storage volume configuration and discovery controller 546 logging one or more discovery log entries reflecting the change in mapping information, management service notifier 548 may send a notification message to management service 530. In some embodiments, management service notifier 548 may send the updated discovery log (e.g., a complete set of discovery log entries, including the updated log entries) with an incremented generation counter value to management service 530. In some embodiments, management service notifier 548 may send a discovery log update that includes only the changed entries and the corresponding incremented generation counter value for discovery log handler 534 to integrate into the previous discovery log record maintained by management service 530. In some embodiments, management service notifier 548 may send the notification message without an updated discovery log and, responsive to receiving the notification message, management service 530 may use a discovery request to receive a discovery log page including the updated log entries and/or a complete updated discovery log from discovery controller 546. Management service notifier 548 may be configured to initiate discovery log synchronization automatically at runtime, responsive to processing the mapping request, to provide real-time discovery log updates and synchronization across fabric nodes and their discovery controllers.

Discovery log synchronizer 550 may include data structures, functions, and interfaces for allowing discovery controller 546 to receive updated discovery logs from one or more management services. For example, management service 530 may receive updated discovery logs from other fabric nodes, including other fabric services 540 in fabric nodes associated with management service 530 and/or or peer fabric nodes with similarly configured management services, and send the updated discovery logs to discovery log synchronizer 550. Discovery log synchronizer 550 may be configured to receive a complete updated discovery log (e.g., all current discovery log entries for the entire storage system) or select updated log entries that may be integrated into a prior discovery log to provide an updated discovery log. In either case, a corresponding generation counter value may enable discovery log synchronizer 550 to evaluate received discovery log updates and identify and store the most up-to-date or current discovery log. Discovery log synchronizer 550 may receive updated discovery logs that include discovery log entries for all fabric subsystem addresses, storage volumes (or other namespaces), and host names across the distributed storage system. Discovery log synchronizer 550 may update discovery log record 592 in fabric node system data 590 associated with the fabric node hosting fabric service 540 to reflect the updated discovery log and enable discovery controller 546 to provide global discovery log pages to host systems in response to a single discovery request.

Memory 516 may include additional logic and other resources (not shown) for configuring and maintaining the fabric network and processing data requests, such as modules for generating, queueing, and otherwise managing input/output data requests. Processing of an data request by storage interface 520 may include any number of intermediate steps that yield at least one data request to the distributed storage system. Management service 530 and fabric service 540 may include any number of additional data structures, functions, and interfaces for configuring and maintaining the fabric network, including controller initialization, administrative commands, configuration parameters, and other fabric node features.

Figure 6:
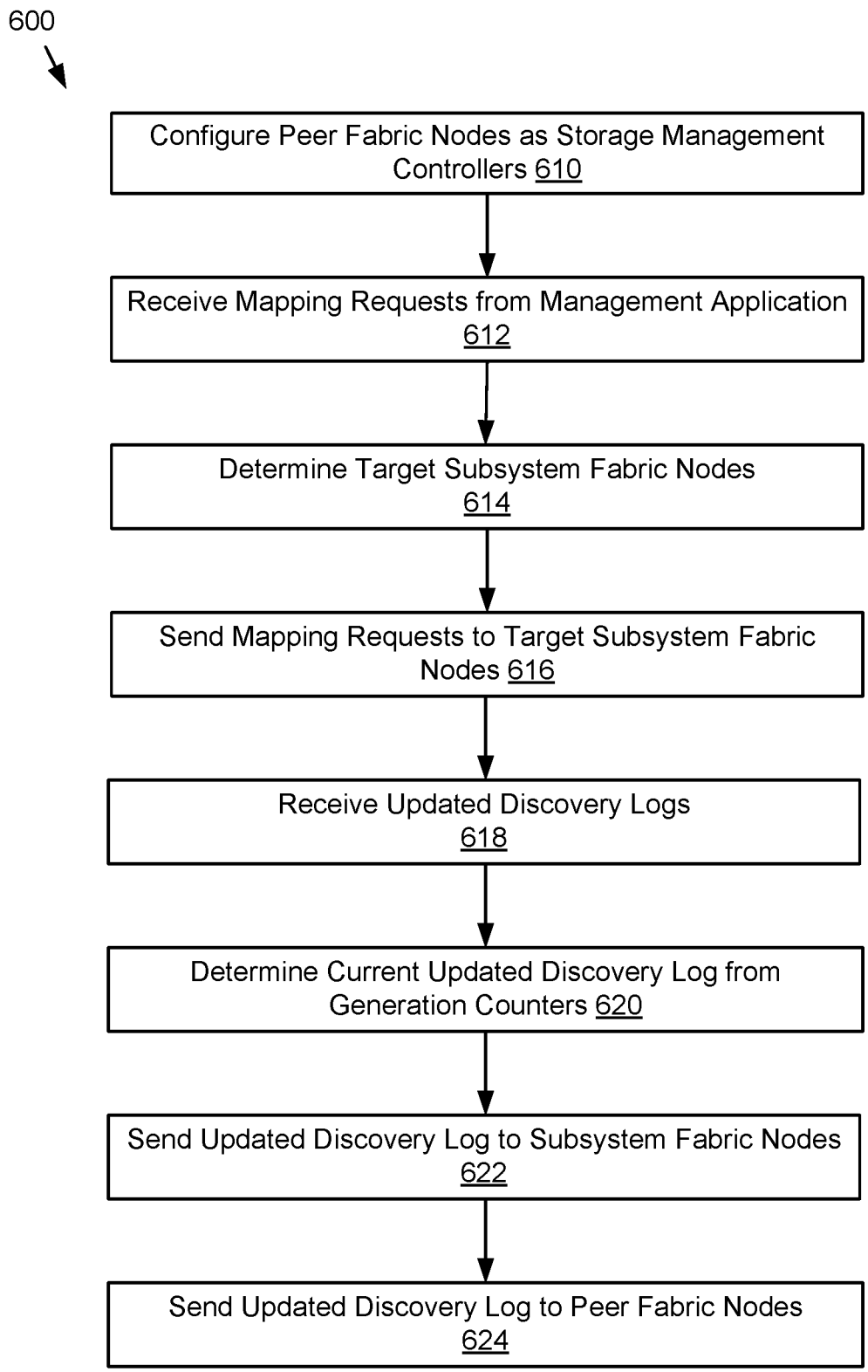
FIG. 6 is a flowchart of an example method of synchronizing discovery logs from a management service.

As shown in FIG. 6, storage system 500 may be operated according to an example method for synchronizing discovery logs from a management service, i.e. according to method 600 illustrated by blocks 610-624 in FIG. 6.

At block 610, a plurality of controllers hosting peer fabric nodes in a fabric network are configured as storage management controllers. For example, a management application may be used to configure a disaggregated storage system employing fabric nodes to use switch, network interface, and/or controller nodes as storage management controllers for a group of storage nodes, such as the storage nodes in the same rack. Configuring the peer fabric nodes may include installing a management service for the fabric subsystem nodes in the storage nodes.

At block 612, a mapping request may be received from the management application. For example, the management service in the storage management controller may receive a mapping request for configuring a storage volume in one or more of the associated storage nodes.

At block 614, a target subsystem fabric node may be determined. For example, the management service may determine a target subsystem fabric node among the storage nodes to receive and execute the mapping request.

At block 616, the mapping request may be sent to the target subsystem fabric node. For example, the management service may send the mapping request to the target subsystem fabric node over the fabric network.

At block 618, at least one updated discovery log may be received. For example, the management service may receive a subsystem updated discovery log from the target subsystem fabric node after the requested storage volume change in the mapping request has been executed. Peer updated discovery logs may also be received from peer fabric nodes.

At block 620, a current updated discovery log may be determined from generation counters associated with stored and/or received discovery logs. For example, the management service may receive multiple updated discovery logs over time and may compare generation counters associated with each discovery log to determine which discovery log is the most recent and should be used as the updated discovery log for synchronization.

At block 622, the updated discovery log may be sent to each subsystem fabric node associated with the storage management controller. For example, the management service may broadcast the updated discovery log to each subsystem fabric node in the associated group of storage nodes to update their respective discovery controllers with the updated discovery log.

At block 624, the updated discovery log may be sent to each peer fabric node in the distributed storage system. For example, the management service may broadcast the updated discovery log to each peer fabric node distributed across the storage system that includes a similar management service for further synchronizing the discovery logs of their associated subsystem fabric nodes.

Figure 7:
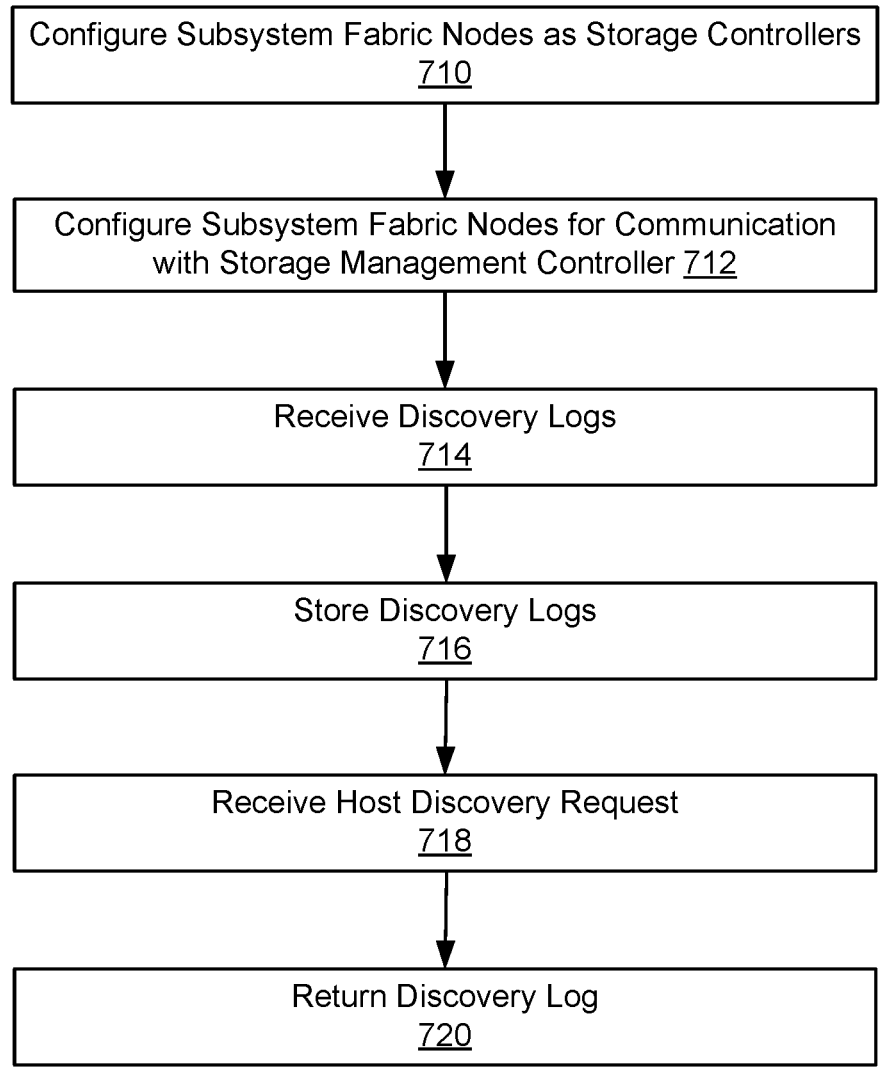
FIG. 7 is a flowchart of an example method of synchronizing discovery logs from a fabric service in the storage subsystems.

As shown in FIG. 7, storage system 500 may be operated according to an example method for synchronizing discovery logs in discovery controllers in subsystem fabric nodes, i.e. according to method 700 illustrated by blocks 710-720 in FIG. 7.

At block 710, a plurality of storage nodes hosting subsystem fabric nodes in a fabric network may be configured as storage controllers. For example, a management application may be used to configure a disaggregated storage system employing fabric nodes to use blade, storage appliance, or other storage nodes as storage controllers for a group of storage devices in the storage node. Configuring the subsystem fabric nodes may include installing a fabric service for the fabric subsystem nodes in each of the storage nodes.

At block 712, the subsystem fabric nodes may be configured for communication with storage management controller acting as a peer fabric node. For example, the management application may be used to associate the subsystem fabric nodes with one or more management services in the storage management controller proximate to the storage nodes.

At block 714, updated discovery logs may be received. For example, the fabric service on each subsystem fabric node may receive updated discovery logs for synchronization of all discovery log entries from across all fabric nodes in the storage system.

At block 716, updated discovery logs may be stored. For example, the fabric service may store the most recent updated discovery log in a discovery log record accessible to a discovery controller supported by the fabric service.

At block 718, a host discovery request may be received from a host system. For example, the discovery controller may be an addressable service that receives discovery requests from host systems that have previously established fabric communications with the fabric subsystem node.

At block 720, a discovery log may be returned to the host system in response to the host discovery request. For example, the discovery controller may send a discovery log page including discovery log entries for all subsystem fabric nodes with storage volumes mapped to the host system, regardless of where those fabric nodes are in the storage system.

Figure 8:
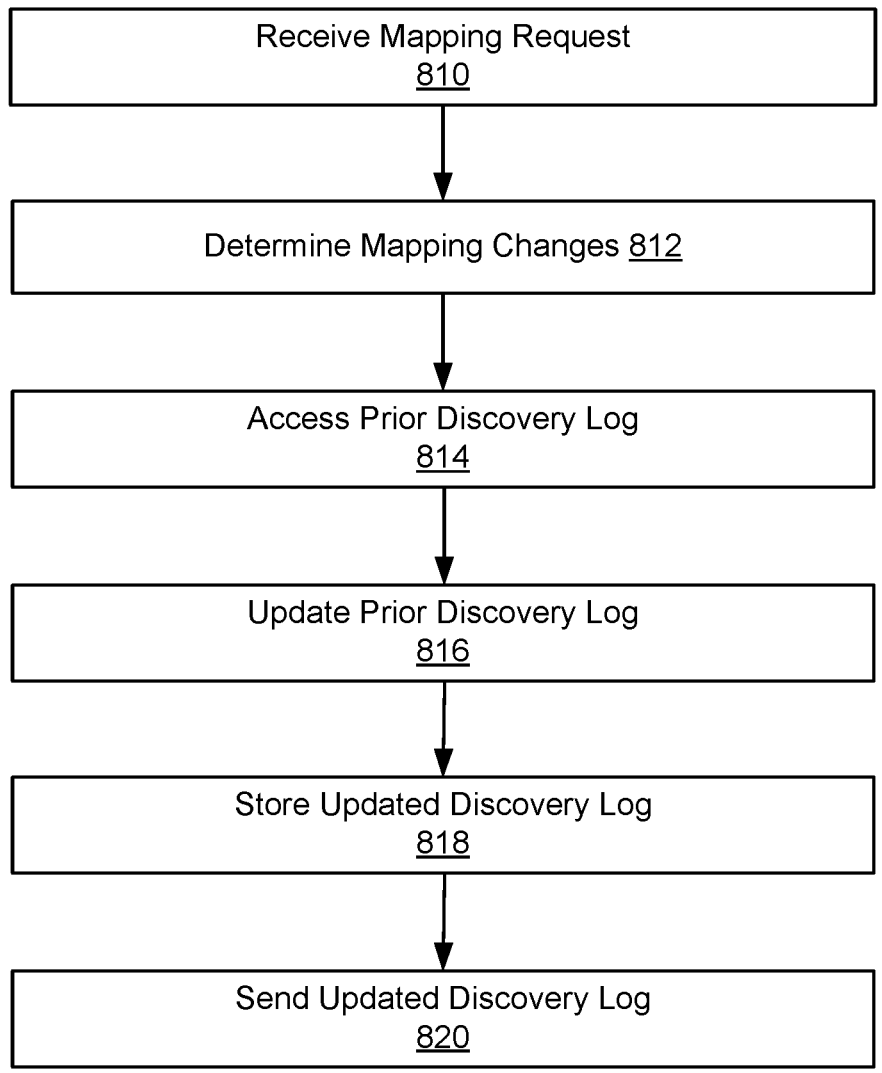
FIG. 8 is a flowchart of an example method of updating discovery logs in the storage subsystems.

As shown in FIG. 8, storage system 500 may be operated according to an example method for generating and sending an updated discovery log for synchronization across discovery controllers, i.e. according to method 800 illustrated by blocks 810-820 in FIG. 8.

At block 810, a mapping request may be received by a target subsystem fabric node. For example, a management service may direct the mapping request to a storage node selected to host the desired storage volume.

At block 812, mapping changes for the target subsystem fabric node may be determined. For example, processing the mapping request may create or change storage volumes and the host systems to which those storage volumes are mapped.

At block 814, a prior discovery log may be accessed. For example, the target subsystem fabric node may already include a complete discovery log for the storage system as of the prior synchronization.

At block 816, the prior discovery log may be updated based on the mapping changes determined at block 812. For example, a new log entry may be created for a new storage volume or a prior log entry may be modified or deleted based on the mapping changes to generate an updated discovery log. A generation counter may be incremented to identify the updated discovery log.

At block 818, the updated discovery log may be stored by the subsystem fabric node for use by the subsystem fabric node's associated discovery controller. For example, the updated discovery log may be stored as a discovery log record in the fabric node.

At block 820, the updated discovery log may be sent for synchronization to other fabric nodes. For example, the fabric service may send the updated discovery log to a management service that may further distribute the updated discovery log to other fabric nodes, such as peer fabric nodes and other subsystem fabric nodes.

Figure 9:
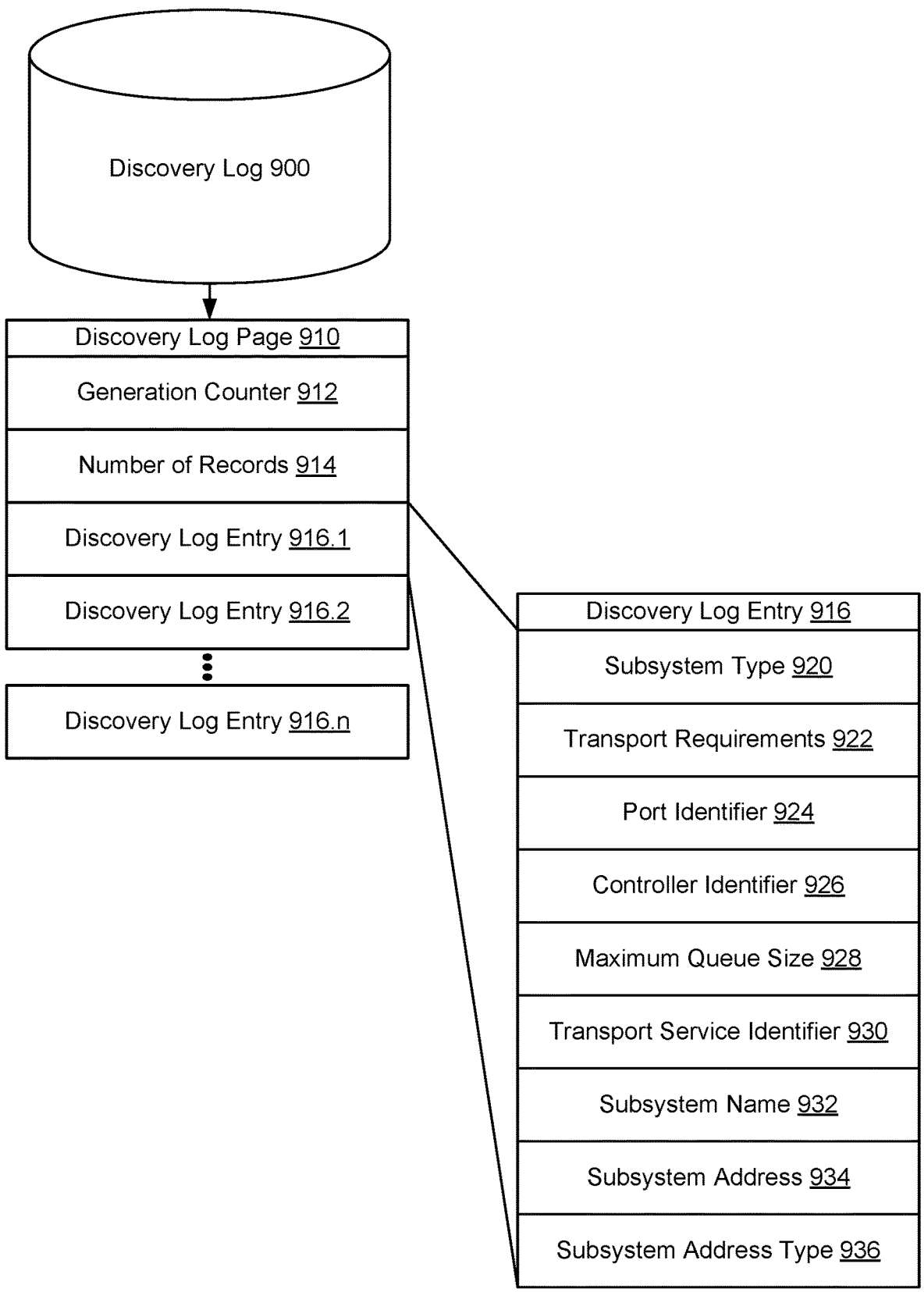
FIG. 9 schematically illustrates the contents of discovery logs and discovery log entries.

FIG. 9 shows an example global discovery log 900 for a distributed storage system, similar to distributed storage systems 100 and 200 and their components, as described in FIGS. 1-5. Discovery log 900 may be an instance of an updated discovery log present in any and all discovery controllers after synchronization. Discovery log 900 may be used to generate a discovery log page 910 for a specific host system. For example, based on host name or a similar unique host identifier, discovery log 900 may be filtered for discovery log entries that contain host mapping information corresponding to the host name. Discovery log page 910 may be specific to an identified host and responsive to a discovery request from that host system.

In some embodiments, discovery log page 910 may include a plurality of data fields that may be encapsulated in a message container for delivery to the requesting host system. For example, discovery log page 910 may include a generation counter value 912, a number of records value 914, and a number of discovery log entries 916 corresponding to the number of records value 914. Generation counter value 912 may correspond to the most recent or highest generation counter value for the updated discovery log 900. Number of records 914 may correspond to the number of discovery log entries in discovery log 900 that have host mapping information indicating the requesting host system.

In some embodiments, discovery log entries 916 may include a plurality of data fields with a predetermined format for providing subsystem address and routing information in accordance with the fabric protocols being used. For example, discovery log entries 916 may include a subsystem type 920, a transport requirements value 922, a port identifier 924, a controller identifier 926, a maximum queue size 928, a transport service identifier 930, a subsystem name 932, a subsystem address 934, and a subsystem address type 936. These fields are provided as examples only and other configurations of subsystem fabric node address, routing, and communication parameters are possible. Any configuration of fabric subsystem address and associated parameters that enable a host system to establish a connection with the fabric subsystem node (e.g., successfully execute a connect command) may be used. In the example shown, discovery log entry 916 in discovery log page 910 does not include specific host mapping information. Because discovery log page 910 is generated for a specific requesting host, discovery log entries 916 are already filtered for relevant host mapping and no host system identifier needs to be included in discovery log page 910 or discovery log entries 916.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first fabric node comprising:
  a first fabric service configured to communicate with a plurality of peer fabric nodes using a network fabric protocol; and
  a management service configured to:
    receive a plurality of updated discovery logs, wherein:
      each updated discovery log of the plurality of updated discovery logs comprises:
        a plurality of discovery log entries; and
        a generation counter;
      each discovery log entry of the plurality of discovery log entries indicates:
        a fabric subsystem address; and
        host mapping information for a corresponding subsystem fabric node; and
      the plurality of discovery log entries includes fabric subsystem addresses for subsystem fabric nodes of the first fabric node and the plurality of peer fabric nodes;
    determine, using the generation counters from the plurality of updated discovery logs, an updated discovery log that is a current updated discovery log including a selected set of current discovery log entries; and
send, responsive to determining the updated discovery log, the updated discovery log to each peer fabric node of the plurality of peer fabric nodes; and
a plurality of subsystem fabric nodes, wherein a target subsystem fabric node of the plurality of subsystem fabric nodes comprises:
a second fabric service configured to:
receive a mapping request;
determine, based on the mapping request, mapping changes for the target subsystem fabric node;
update, responsive to mapping changes for the target subsystem fabric node, a prior discovery log to generate a new updated discovery log; and
send, to the first fabric node, the new updated discovery log.

2. The system of claim 1, further comprising:
a first logical network configured for management communication between the management service and the plurality of subsystem fabric nodes; and
a second logical network configured for host communication between a host system and the plurality of subsystem fabric nodes, wherein the second fabric service is further configured to send the updated discovery log to the host system using the second logical network.

3. The system of claim 1, wherein:
each subsystem fabric node of the plurality of subsystem fabric nodes is configured to:
receive the updated discovery log;
store the updated discovery log;
receive, from a host system, a host discovery request;
determine, based on the host system and the host mapping information in the plurality of discovery log entries, a host discovery log from the updated discovery log; and
return, to the host system, the host discovery log.

4. The system of claim 3, wherein:
the management service is further configured to send, responsive to determining the updated discovery log, the updated discovery log to each subsystem fabric node of the plurality of subsystem fabric nodes; and
each subsystem fabric node of the plurality of subsystem fabric nodes is further configured to receive the updated discovery log from the first fabric node.

5. The system of claim 1, wherein:
the first fabric node is configured as a storage management controller;
each subsystem fabric node of the plurality of subsystem fabric nodes is configured as a storage node including a plurality of storage devices; and
the plurality of storage devices for each subsystem fabric node is configured for access by a host system using:
the network fabric protocol; and
at least one fabric subsystem address of the plurality of fabric subsystem addresses.

6. The system of claim 1, wherein:
the management service is further configured to:
receive the mapping request from a management application;
determine, based on the mapping request, the target subsystem fabric node; and
send, to the target subsystem fabric node, the mapping request.

7. The system of claim 6, wherein:
the management service is further configured to receive the mapping request through a management network that is logically distinct from a host fabric network; and
the host fabric network includes communication, using the network fabric protocol, among:
the plurality of subsystem fabric nodes; and
at least one host system.

8. The system of claim 1, wherein
the management service is further configured to:
evaluate, using the generation counter from each updated discovery log of the plurality of updated discovery logs, updated discovery log entries in each updated discovery log to determine the selected set of current discovery log entries.

9. The system of claim 1, further comprising:
the plurality of peer fabric nodes, wherein each peer fabric node of the plurality of peer fabric nodes is configured to:
receive peer updated discovery logs from the first fabric node and each other peer fabric node in the plurality of peer fabric nodes;
receive subsystem updated discovery logs from a corresponding plurality of subsystem fabric nodes that corresponds to that peer fabric node;
send, responsive to receiving the peer updated discovery logs, the peer updated discovery logs to the corresponding plurality of subsystem fabric nodes; and
send, responsive to receiving the subsystem updated discovery logs, the subsystem updated discovery logs to:
the first fabric node and each other peer fabric node of the plurality of peer fabric nodes; and
the corresponding plurality of subsystem fabric nodes.

10. The system of claim 9, wherein:
each peer fabric node of the plurality of peer fabric nodes is configured as a storage management controller; and
each peer fabric node of the plurality of peer fabric nodes is configured to:
communicate with the first fabric node and each other peer fabric node of the plurality of peer fabric nodes through a management network that is logically distinct from a host fabric network; and
communicate with the corresponding plurality of subsystem fabric nodes through a corresponding backplane network that:
corresponds to that peer fabric node; and
is logically distinct from the host fabric network.

11. A computer-implemented method, comprising:
configuring, to communicate with a first peer fabric node of a plurality of peer fabric nodes, a first plurality of subsystem fabric nodes that corresponds with the first peer fabric node;
receiving a plurality of updated discovery logs, wherein:
each updated discovery log of the plurality of updated discovery logs comprises:
a plurality of discovery log entries; and
a generation counter;
each discovery log entry of the plurality of discovery log entries indicates:
a fabric subsystem address; and
host mapping information for a corresponding subsystem fabric node; and the plurality of discovery log entries includes fabric subsystem addresses for subsystem fabric nodes of the plurality of peer fabric nodes;

determining, using the generation counters from the plurality of updated discovery logs, an updated discovery log that is a current updated discovery log including a selected set of current discovery log entries;

sending, by the first peer fabric node and responsive to determining the updated discovery log, the updated discovery log to each other peer fabric node of the plurality of peer fabric nodes, wherein each peer fabric node of the plurality of peer fabric nodes is configured to communicate with each other peer fabric node of the plurality of peer fabric nodes using a network fabric protocol;

updating, by a target subsystem fabric node of the first plurality of subsystem fabric nodes and responsive to mapping changes for the target subsystem fabric node, a prior discovery log to generate a new updated discovery log;

sending, from the target subsystem fabric node to the first peer fabric node, the new updated discovery log;

receiving, by the first peer fabric node, the new updated discovery log; and adding, by the first peer fabric node, the new updated discovery log to the plurality of updated discovery logs for determining a next current updated discovery log.

12. The computer-implemented method of claim 11, further comprising:

configuring a first logical network for management communication between the first peer fabric node and the first plurality of subsystem fabric nodes;

configuring a second logical network for host communication between a host system and the first plurality of subsystem fabric nodes; and sending, using the second logical network, the updated discovery log from at least one subsystem fabric node of the first plurality of subsystem fabric nodes to the host system.

13. The computer-implemented method of claim 11, further comprising:

receiving, at the first plurality of subsystem fabric nodes, the updated discovery log;

storing, at each subsystem fabric node of the first plurality of subsystem fabric nodes, the updated discovery log;

receiving, at any subsystem fabric node of the first plurality of subsystem fabric nodes, a host discovery request from a host system;

determining, based on the host system and the host mapping information in the plurality of discovery log entries, a host discovery log from the updated discovery log; and returning, to the host system, the updated discovery log.

14. The computer-implemented method of claim 13, further comprising:

sending, from the first peer fabric node and responsive to determining the updated discovery log, the updated discovery log to each subsystem fabric node of the first plurality of subsystem fabric nodes; and receiving, at each subsystem fabric node of the first plurality of subsystem fabric nodes, the updated discovery log from the first peer fabric node.

15. The computer-implemented method of claim 11, further comprising:

configuring the first peer fabric node as a storage management controller; and configuring each subsystem fabric node of the first plurality of subsystem fabric nodes as a storage node including a plurality of storage devices, wherein the plurality of storage devices for each subsystem fabric node is configured for access by a host system using:
the network fabric protocol; and
at least one fabric subsystem address of the plurality of fabric subsystem addresses.

16. The computer-implemented method of claim 11, further comprising:

receiving, by the first peer fabric node, a mapping request from a management application;

determining, by the first peer fabric node and based on the mapping request, the target subsystem fabric node;

sending, by the first peer fabric node and to the target subsystem fabric node, the mapping request;

receiving, by the target subsystem fabric node, the mapping request; and determining, by the target subsystem fabric node and based on the mapping request, the mapping changes for the target subsystem fabric node.

17. The computer-implemented method of claim 16, wherein:

receiving the mapping request by the first peer fabric node includes receiving the mapping request through a management network that is logically distinct from a host fabric network; and the host fabric network includes communication, using the network fabric protocol, among:
the first plurality of subsystem fabric nodes; and
at least one host system.

18. The computer-implemented method of claim 11, further comprising:

evaluating, using the generation counter from each updated discovery log of the plurality of updated discovery logs, updated discovery log entries in each updated discovery log to determine the selected set of current discovery log entries.

19. The computer-implemented method of claim 11, further comprising:

receiving, at each peer fabric node in the plurality of peer fabric nodes, peer updated discovery logs from each other peer fabric node in the plurality of peer fabric nodes;

receiving, at each peer fabric node in the plurality of peer fabric nodes, subsystem updated discovery logs from a corresponding plurality of subsystem fabric nodes that corresponds to that peer fabric node;

sending, from each peer fabric node receiving the peer updated discovery logs, the peer updated discovery logs to the corresponding plurality of subsystem fabric nodes; and sending, from each peer fabric node receiving the subsystem updated discovery logs, the subsystem updated discovery logs to:
each other peer fabric node of the plurality of peer fabric nodes; and
the corresponding plurality of subsystem fabric nodes.

20. A storage system, comprising:

a plurality of peer fabric nodes configured to communicate with each other peer fabric node of the plurality of peer fabric nodes using a network fabric protocol;

a corresponding plurality of subsystem fabric nodes that:
correspond to each peer fabric node of the plurality of peer fabric nodes; and
are configured to communicate with at least one host system using the network fabric protocol;

means for receiving a plurality of updated discovery logs, wherein:
  each updated discovery log of the plurality of updated discovery logs comprises:
    a plurality of discovery log entries; and
    a generation counter;
  each discovery log entry of the plurality of discovery log entries indicates:
    a fabric subsystem address; and
    host mapping information for a corresponding subsystem fabric node; and
  the plurality of discovery log entries includes fabric subsystem addresses for subsystem fabric nodes of the plurality of peer fabric nodes;
means for determining, using the generation counters from the plurality of updated discovery logs, an updated discovery log that is a current updated discovery log including a selected set of current discovery log entries;
means for sending, by a corresponding peer fabric node and responsive to determining the updated discovery log, the updated discovery log to each other peer fabric node of the plurality of peer fabric nodes;
means for sending, by each peer fabric node of the plurality of peer fabric nodes and responsive to receiving the updated discovery log, the updated discovery log to each other subsystem fabric node of the corresponding plurality of subsystem fabric nodes;
means for updating, by a target subsystem fabric node of the corresponding plurality of subsystem fabric nodes and responsive to mapping changes for the target subsystem fabric node, a prior discovery log to generate a new updated discovery log;
means for sending, from the target subsystem fabric node, the new updated discovery log;
means for receiving, by the corresponding peer fabric node of the plurality of peer fabric nodes that corresponds to the target subsystem fabric node, the new updated discovery log; and
means for adding the new updated discovery log to the plurality of updated discovery logs for determining a next current updated discovery log.

\* \* \* \* \*